(12) United States Patent
Mair

(10) Patent No.: US 8,029,223 B2
(45) Date of Patent: Oct. 4, 2011

(54) SCREW AND ITS COMBINATION WITH A CONICAL SEALING DISK

(75) Inventor: Roland Mair, Gotzis (AT)

(73) Assignee: SFS Intec Holding AG, Heerbrugg (CH)

(*) Notice: Subject to any disclaimer, the term of this patent is extended or adjusted under 35 U.S.C. 154(b) by 61 days.

(21) Appl. No.: 12/301,322

(22) PCT Filed: Aug. 28, 2007

(86) PCT No.: PCT/EP2007/058898
§ 371 (c)(1),
(2), (4) Date: May 13, 2009

(87) PCT Pub. No.: WO2008/028838
PCT Pub. Date: Mar. 13, 2008

(65) Prior Publication Data
US 2010/0068004 A1    Mar. 18, 2010

(30) Foreign Application Priority Data
Sep. 6, 2006 (DE) .......... 10 2006 041 860

(51) Int. Cl.
*F16B 43/02* (2006.01)
(52) U.S. Cl. ............................. 411/542; 411/371.2
(58) Field of Classification Search .............. 411/369, 411/370, 371.1, 371.2, 372, 542
See application file for complete search history.

(56) References Cited

U.S. PATENT DOCUMENTS

| 2,982,573 A | 5/1961 | McKee, Jr. | |
| 3,422,721 A * | 1/1969 | Yonkers | 411/369 |
| RE27,085 E * | 3/1971 | Weidner, Jr. | 411/371.1 |
| 3,566,738 A * | 3/1971 | Cupit | 411/369 |
| 3,803,972 A * | 4/1974 | Deutsher | 411/337 |

(Continued)

FOREIGN PATENT DOCUMENTS
EP    0243526    9/1990
(Continued)

OTHER PUBLICATIONS

Technische Dokumentation, SFS Stadler Befestigungstechnik Bau, CH-9435 Heerbrugg, DD. 3.27.88.D, 1986.

*Primary Examiner* — Gary Estremsky
(74) *Attorney, Agent, or Firm* — Volpe and Koenig, P.C.

(57) ABSTRACT

A screw (60) is provided, having a shaft (32) and a head (66), for fastening a component onto a substructure utilizing a tightly pressing conical sealing disk (50) against the component. The screw head (66) is configured at the bottom (64) thereof around the shaft (32) as a cone that is tapered in the direction of the top (68) of the screw head (66). The cone angle of the conical sealing disk (50) measured against a perpendicular line to the disk axis is equal to, or larger than the cone angle (alpha) of the screw head (66), which is measured against a perpendicular line to the screw axis. When the screw (60) is tightened, the conical bottom (64) of the screw head (66) and the conical top (58) of the sealing disk (50) are in mutual surface contact with each other. This maintains a sealing connection. Through the conical configuration of the bottom (64) of the screw head (66) the so-called "cupping" of the sealing disk (50) is prevented when the screw (60) is tightened.

4 Claims, 4 Drawing Sheets

U.S. PATENT DOCUMENTS

| | | | |
|---|---|---|---|
| 4,292,876 A | 10/1981 | De Graan | |
| 4,460,300 A * | 7/1984 | Bettini et al. | 411/375 |
| 4,749,321 A * | 6/1988 | Knohl et al. | 411/371.1 |
| 4,875,818 A | 10/1989 | Reinwall | |
| 5,126,509 A * | 6/1992 | Yen | 174/504 |
| 5,156,509 A | 10/1992 | Wu | |
| 6,789,989 B2 | 9/2004 | Walther | |
| 6,854,942 B1 | 2/2005 | Hargis | |

FOREIGN PATENT DOCUMENTS

| | | |
|---|---|---|
| EP | 0760431 | 3/1997 |
| FR | 2390619 | 12/1978 |
| WO | 8600118 | 1/1986 |
| WO | 0221013 | 3/2002 |

* cited by examiner c)

b)

a)

c)

b)

a)

SCREW AND ITS COMBINATION WITH A CONICAL SEALING DISK

BACKGROUND

The invention relates to a combination of a screw, with a shaft and a head, having a circular conical sealing disk that is guided or can be guided on the shaft up to the bottom of the screw head.

Such combinations of a screw with a conical sealing disk are known, for example, from the company brochure topform screw fastener: Technical Specification (Technische Dokumentation), SFS Stadler Befestigungstechnik Bau, CH 9435 Heerbrugg, BB.3.27.88.D, 1986. On the screw of this combination, the circular bottom of the screw head has a surface perpendicular in reference to the axis of the screw. Such combinations serve to fasten components to a thin steel or aluminum substructure or generally for fastening sheet metal to sheet metal or sheet metal to wood. A screw as used in the above-mentioned company brochure is also shown in U.S. Pat. No. 6,854,942 B1 differing from the screw shown in the brochure only in that below the screw head a special additional thread is provided on the shaft, by which the sealing disk is held below the screw head perpendicularly in reference to the axis of the shaft.

Prior art also includes combinations of a screw in which the bottom of the head is embodied concavely so that a rubber gasket can be held more securely between the screw head and the support. Such combinations of a screw with a rubber gasket are known, for example form U.S. Pat. No. 4,875,818, EP 140991 B1, or U.S. Pat. No. 6,789,989 B2. A tapping screw with a concave bottom of the screw head is known from EP 0243526 B1. By the concave embodiment of the bottom of the screw head space is created to accept a circular bead, which is provided around a receiving bore in a cover sheet or the like, into which the screw can be driven.

Combinations of the type of screw and circular conical gasket of the type mentioned at the outset is preferably used for the assembly of profiled steel sheets for roof, wall, and ceiling construction, such as known e.g., from the IFBSINFO guideline 8.01 by the Industrieverband zur Foerderung des Bauens mit Stahlblech e.V. (Industrial Association for Promoting Construction with Steel Sheet-metal), Issue April 2002. According to the brochure, page 10, the gaskets comprise a metal back onto which an elastomer layer made from EPDM is vulcanized in an undetachable manner. The metal back is usually 1.0 mm thick and comprises stainless steel, aluminum, or galvanized steel. The elastomer layer EPDM is 2.0 or 3.0 mm thick. When the screws are tightened, these gaskets form an interior seal at the shaft of the screw and an exterior seal at the point where the movements of sheet metal or the like have to be compensated. Temperature related expansions of the structural elements and traffic load of a building are compensated according to specifications. The large sealing surface simultaneously prevents any metal/metal contact (galvanic corrosion) and protects the components from mechanic damage by assembly tools. This can only work flawlessly when the combination of screw and gasket has been correctly placed with a precisely adjusted depth of insertion (path-related screw devices.) The gaskets are assembled on the screws such that they cannot be lost. The screws reach the construction site ready for use as a screw/gasket combination. In this context, the above-mentioned guideline requires (at page 25) that screws with gaskets are to be screwed in according to a depth stop. Any improper deformation of the gasket (washer with elastomer seal) shall be prevented by the depth stop on the screw. The screw may only be tightened to such an extent that the washer and the elastomer seal are compressed according to the specifications of the manufacturer. Unfortunately, in practice such screws with gaskets are used without any depth stop, contrary to the guideline. This leads to the screws being screwed-in either too loosely or too tightly. In the above-mentioned company brochure this is shown on page 10 and in the above-mentioned guideline on page 25.

A particular problem is given when the screw is over-tightened. This can be clearly illustrated in the combination of screw and gasket shown in the attached FIG. 5 (prior art.) In FIG. 5 the screw in its entirety is marked with the reference character 10 and the gasket in its entirety with the reference character 20. According to the illustration in FIG. 5b, the gasket 20 is guided on a shaft 12 of the screw to the bottom 14' of the screw head 16 and comes into a linear contact with the bottom 14' at a circle at the interior perimeter of the circular gasket 20. In this position the gasket 20 is held on the shaft 12 of the screw 10 by an elastomer seal 22.

When placing the screw 10, based on the linear contact between the screw head 16 and the gasket 20, first pressure is applied to the gasket in the proximity of its center. Then, starting from this linear contact, increasingly a circular planar contact develops between the screw head 16 and the gasket 20.

When installation occurs without any depth stop, unfortunately a common practice, the pressure of the screw head 16 acting upon the gasket 20 causes the gasket to be finally brought into a planar shape from which it further converts into a conical shape in a snapping motion, with its cone tapering downwards, contrary to the original cone which was tapering upwards. This process is called "cupping", because the gasket accepts a cup-shape. In this position of the gasket 20 a tight connection is not ensured because the screw head 16 contacts the upper side of the gasket 20 only at the exterior perimeter of its collar 17 and because the elastomer seal of the gasket has been improperly deformed such that it bulges out underneath the gasket and no longer sufficiently seals the exterior perimeter of the shaft. Water will collect in the cup-shaped gasket and finally finds its way to below the screw head and extends along the shaft downwards, because as already stated the elastomer seal no longer seals properly at the shaft.

It is particularly problematic that the force to be applied maximally to the screw head is almost precisely equivalent to the one at which a trend for cupping develops. For this trend, the existence of an elastomer seal 22 between the support and the gasket 20 is of major importance. The displacement of the elastomer seal 22 beyond the exterior perimeter of the gasket 20 enhances the trend for cupping even more, because the support at the interior perimeter of the gasket 20 becomes correspondingly smaller.

U.S. Pat. No. 4,292,876 states that in a combination of a screw and a gasket the trend for "cupping" can be reduced by the use of a conical gasket comprising a steel ring and an elastomer seal, able to withstand higher torque.

In EP 0760431 A1 problems are discussed which occur when in a combination of a screw and a rubber gasket either insufficient or excessive pressure is applied to the rubber gasket when the screw is placed. As one solution for this problems it is suggested to adjust the torque or the depth stop of the placement tool such that a certain pressure to the rubber gasket is not exceeded. It is suggested in another solution to hold the rubber gasket back by way of flanges.

From U.S. Pat. No. 5,156,509 it is known to ensure tightness in a combination of a screw and a gasket comprising a metal part and an elastic seal such that the metal part and the seal are arranged in a recess.

Finally, from U.S. Pat. No. 2,982,573 it is known to use a metal gasket, which in its original state is conical, made from metal and a rubber seal mounted thereto, which are compressed flat when the screw is tightened. For achieving a better seal the metallic gasket has a flange at its exterior perimeter by which the rubber seal is held back when the metallic gasket is compressed flat.

SUMMARY

The object of the invention is to provide a combination of the type mentioned at the outset such that a tight connection below the screw head can be ensured securely and that particularly the trend for cupping is reduced.

This object is attained according to the invention in a combination of the type mentioned at the outset in that the screw head is embodied at its bottom around the shaft in the form of a cone with a conical angle in reference to a line perpendicular to the axis of the screw, which tapers in a direction towards the top of the screw head and that the cone angle is selected such that the bottom of the screw head and the conical metal ring are largely embodied complementary.

The screw of the combination according to the invention renders the seal more secure below the head in the area of its interior seal because when the screw is tightened a planar contact develops or is at least facilitated between it and the conical gasket faster than in prior art and, this is of deciding importance, in an ultimately placed screw also maintained between its head and the conical gasket. Due to the fact that a planar contact, once established between the screw head and the conical gasket, does not convert or return to a linear contact between them, the trend for cupping is considerably lower than in prior art. According to the invention, this simultaneously prevents any inappropriate deformation of the metal ring and the elastomer seal of the gasket. Furthermore, the force that can be applied by the screw head to the gasket until it begins cupping, with this force being only irrelevantly smaller than the force causing cupping, is considerably higher in a screw of the combination according to the invention than in prior art. In the combination according to the invention the seal between the gasket and the support as well as between the gasket and the screw is still maintained when the screw is set at an angle. In the set position of the screw between its head and the conical gasket the existing mutual planar contact ensures even in this case that a reliable seal is provided and maintained at this point.

In the combination of a screw and a conical gasket, in which according to FIG. 5 the screw head is provided with a circular collar at its exterior perimeter radially projecting beyond the exterior perimeter, when the diameter of this collar is enlarged a lever-effect developing between the conical gasket and the collar of the screw head is reduced, rendering the trend for cupping to become lower as well. The reason here should be that the lever action leading to cupping becomes increasingly smaller when the exterior diameter of the collar grows.

Advantageous embodiments of the combinations according to the invention form the objects of the dependent claims.

When in an embodiment of the combination according to the invention the cone angle of the bottom of the screw head has a value in a range from 5° to 15°, the screw of the combination according to the invention is suitable for common conical gaskets, usually having a cone angle from 10° to 15°.

When in an embodiment of the combination according to the invention the cone angle of the gasket can be reduced by tightening the screw, the gasket finally adjusts to the form of the bottom of the screw head when the screw is tightened and thus ensures the seal of the tight connection to be produced.

When in another embodiment of the combination according to the invention the cone angle of the bottom of the screw head is equivalent to the cone angle of the gasket prior to the screw being tightened, the combination is particularly suitable for the use of conical gaskets that can be deformed when a screw is set, i.e. for example in gaskets made from aluminum.

When in another embodiment of the combination according to the invention the cone angle of the bottom of the screw head is smaller than the cone angle of the gasket prior to the screw being tightened, a planar contact and thus a tight connection is not created between the screw head and the gasket until the screw is increasingly tightened.

When in another embodiment of the combination according to the invention the cone angle of the bottom of the screw head is smaller than the cone angle of the gasket by up to 5° and preferably by less than 3°, the cone angle of the gasket can vary within a certain range. In any case, when the screw is tightened the intended planar contact between the bottom of the screw head and the top of the gasket will develop.

When in another embodiment of the combination according to the invention the cone angle of the gasket has a value ranging from 10° to 15° and preferably a value of 10° or 15° it represents a gasket with a common cone angle that can be combined with a screw, with the bottom of the screw head having a cone angle of a value ranging from 5° to 15°.

When in another embodiment of the combination according to the invention the metal ring is provided with an elastomer seal at its conically expanded bottom and represents an elastomer seal made from a terpolymer elastomer (rubber) and preferably from an ethylene-propylene-diene rubber (EPDM) or the like, a planar mutual contact between the bottom of the screw head and the top of the gasket can safely be achieved in any case, regardless of the metal that the conical metal ring of the gasket has been made from.

BRIEF DESCRIPTION OF THE DRAWINGS

In the following, exemplary embodiments of the invention are shown with reference to the attached drawings. Shown are.

DETAILED DESCRIPTION OF THE PREFERRED EMBODIMENTS

Figure 1:
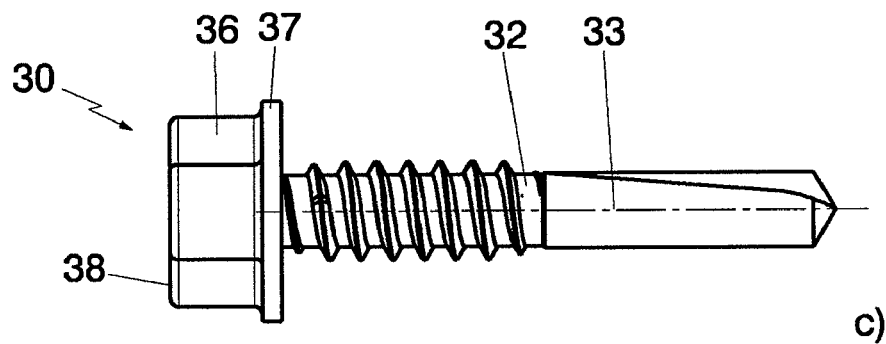
FIG. 1 in FIGS. 1*a*-1*c*, the screw of a first embodiment of the combination according to the invention in a top view, in a partially cross-sectional, longitudinal side view, and in a longitudinal side view, FIG. 2 a cross-sectional view of a common conical gasket that can be used in combination with a screw according to FIG. 1, FIG. 3 in FIGS. 3*a*-3*c*, the screw according to FIG. 1 in combination with a conical gasket in a top view, in a partially cross-sectional, longitudinal side view, and in a longitudinal side view, FIG. 4 in a partially cross-sectional, partial longitudinal side view, a second embodiment of the combination according to the invention with a gasket according to FIG. 2, and FIG. 5 in FIGS. 5*a*-5*c*, a combination of a screw and a conical gasket of the prior art in a top view, in a partially cross-sectioned longitudinal side view, and in a longitudinal side view.
Figure 1:
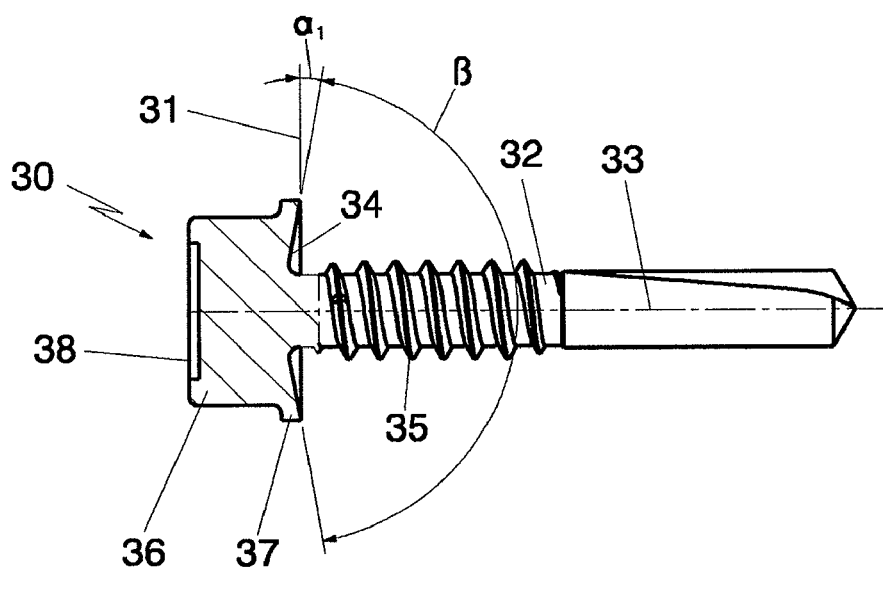
Figure 1:
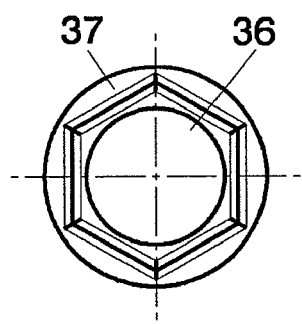
Figure 5:
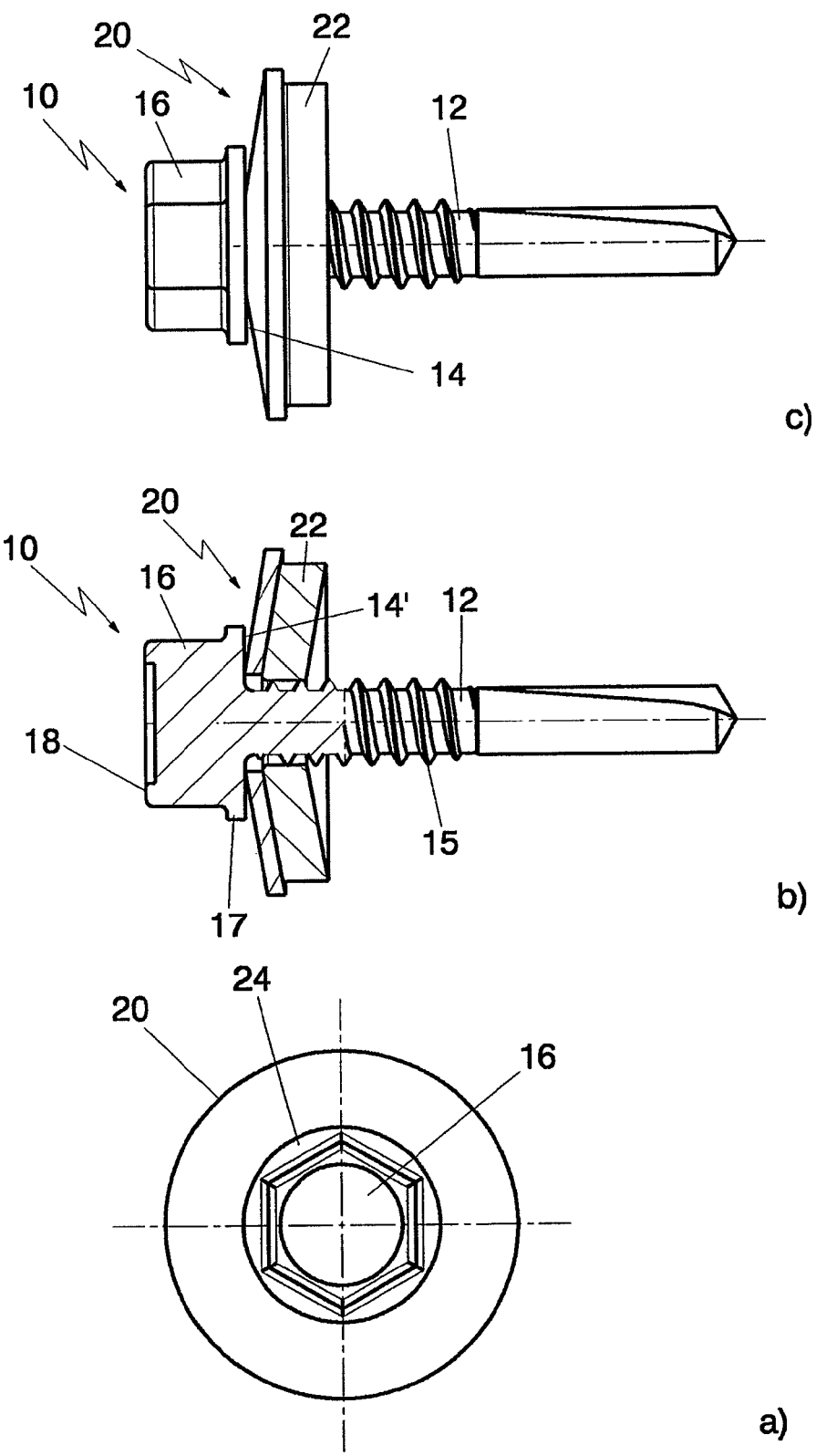

FIG. 1 shows, in a top view (FIG. 1*a*) in a partially cross-sectioned longitudinal side view (FIG. 1*b*) and in a longitudinal side view (FIG. 1c), the screw of a first embodiment of the combination according to the invention, in its entirety marked with the reference character 30. Except for the embodiment of the bottom 34 of the screw head 36, the screw 30 is in other aspects equivalent to the conventional screw 10 according to FIG. 5. In both cases it relates to a self-cutting, tapping screw, commonly comprising stainless steel, galvanized steel, or aluminum. The screw head 36 is embodied at its bottom 34 as a cone around the shaft 43, which tapers in the direction towards the top 38 of the screw head 36. The cone of the bottom 34 of the screw head 36 has a cone angle $\alpha_1$ measured in reference to a line 31 perpendicular in reference to the axis 33 of the screw, having a value ranging from 5° to 15° and in the exemplary embodiment shown in FIG. 1b having a value of 10°. The conical bottom 34 of the screw head 36 therefore forms the outer surface of a frustum with a cone angle β measuring 160°. The screw head 36 has a radially projecting collar 37 at its exterior perimeter.

Additional details of the screw 30 are irrelevant for understanding the invention and thus are not described here. The screw 30 serves to fasten a component (not shown) on a sub structure (not shown) by tightly compressing a conical gasket 40, shown in a combination with the screw 30 in FIG. 3, which is now being referred to. Simultaneously reference is made to FIG. 2, which shows a similarly conical gasket as a detail marked 50. The conical gasket 50 has a cone angle $\alpha_2$ measured in reference to a line 55 perpendicular to the axis 53 of the gasket. Before the combination according to FIG. 3 is discussed in greater detail the principle structure of a conical gasket is described in greater detail using the example of the gasket 50.

Figure 2:
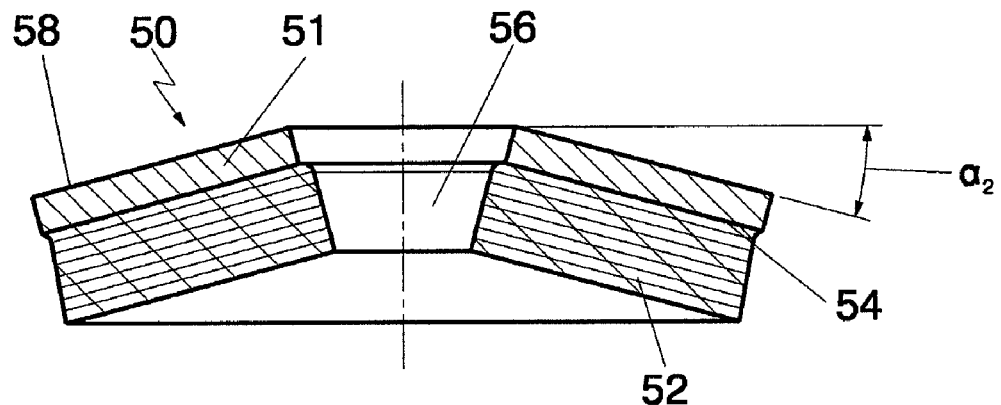

The gasket 50 according to FIG. 2 is a conical metallic ring 51, which on its conically expanding bottom 54 facing the component (not shown) to be fastened is provided with an elastomer seal 52. The elastomer seal 52 may comprise a terpolymer elastomer (rubber) and preferably an ethylene-propylene-diene rubber (EPDM) or the like. The gasket 50 has a central opening 56, circular in its cross-section, which can receive the shaft of a screw such as the screw 30 according to FIG. 1. The elastomer seal has been fixed to the bottom 54 of the metallic ring 51 by way of vulcanization. The gasket 50 shown in FIG. 2 has a cone angle $\alpha_2$ of 10°. Instead, it may also have a common cone angle $\alpha_2$ of 15°. The cone angle $\alpha_2$ may also have a value ranging from 10° to 15° or a value slightly above or below said range. The gasket 50 can be more or less deformed by tightening the screw depending on the type of metal the metal ring 51 is made from, and depending on the force exercised onto the gasket 50 by the screw head. In all figures, the screws and the gaskets are shown in a state in which the screw is not tightened.

Figure 3:
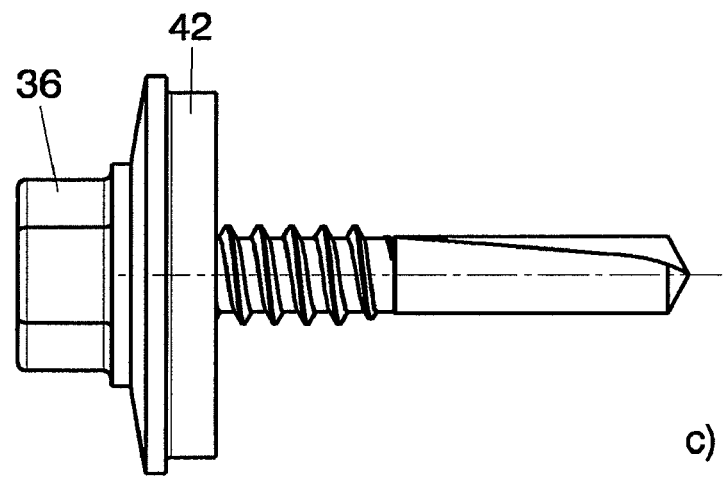
Figure 3:
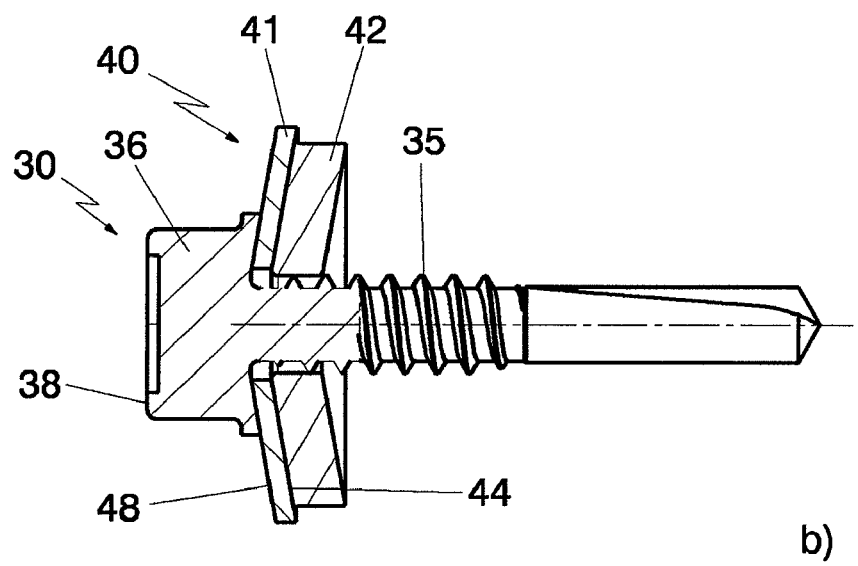
Figure 3:
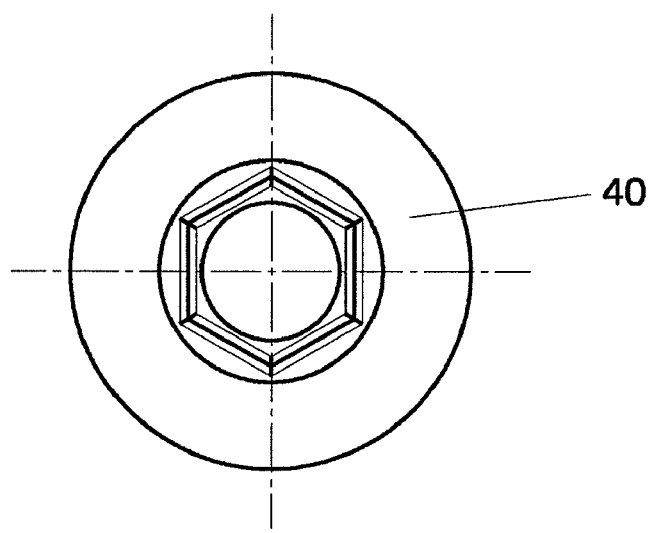

FIG. 3 shows a combination of the screw 30 according to FIG. 1 and a conical gasket 40 similar to the one shown in FIG. 2. FIG. 3 shows the combination in a top view (FIG. 3a), in a partially cross-sectional, longitudinal side view (FIG. 3b), and in a longitudinal side view (FIG. 3c.) The gasket 40 differs from the gasket 50 only in a slightly different embodiment of the elastomer seal 42 which is not relevant for the invention. In FIG. 3b the conical gasket 40 is brought to the bottom 34 of the head and is held in this position by a mutual contact of the elastomer seal 42 to a thread 35 of the screw 30 until the combination is not in operation. The cone angle $\alpha_2$ of the conical gasket 40 and the cone angle $\alpha_1$ of the bottom 34 of the screw head 36 are equivalent so that according to the illustration in FIG. 3b the bottom 34 of the screw head and the top 48 of the conical gasket 40 are mutually in planar contact. This planar contact is essentially maintained when the screw 30 is tightened. This is conditional to the gasket 40 comprising a material, for example steel, that cannot easily be deformed.

When strong forces are applied to a conical gasket or when the conical gasket, as mentioned above, comprises metal allowing the gasket to be pressed into a slightly flatter conical state during tightening, it is beneficial to use a screw in which the cone angle $\alpha_1$ of the bottom of the screw head is smaller than the cone angle $\alpha_2$ of the gasket. Here, an exemplary embodiment is shown in FIG. 4, which is now explained in greater detail.

Figure 4:
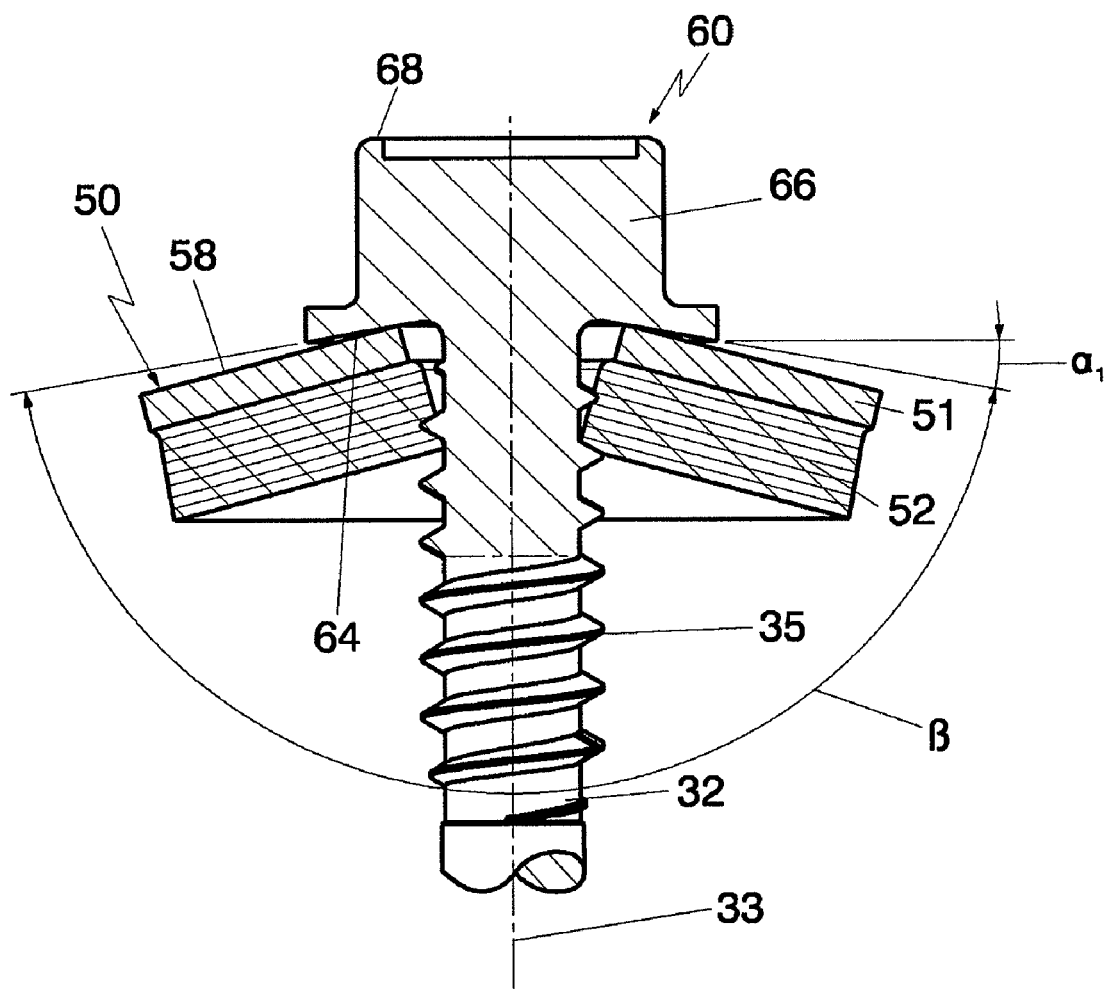

FIG. 4 shows a screw 60, its head 66 having a bottom 64, with its cone angle $\alpha_1$ being smaller than the cone angle $\alpha_2$ of the gasket 50 according to FIG. 2, used in the combination according to FIG. 4. The gasket 50 has a cone angle $\alpha_2$ of 10°. However, the bottom 64 of the screw head 66 has a cone angle $\alpha_1$ ranging from approximately 5° to 7°. Therefore, the cone of the screw head 66 has an opening angle β ranging from 166° to 170°. When the screw 60 is tightened the cone angle $\alpha_2$ of the gasket 50 is reduced until the top 48 of the metal ring 51 of the gasket 50 and the bottom 64 of the screw head 66 mutually contact. In the original state shown in FIG. 4, in which the screw 60 has not been tightened, the gasket 50 is in a circular linear contact to the bottom 64 of the screw head 66. The cone angle $\alpha_2$ of the gasket 50, which is greater than the cone angle $\alpha_1$ of the bottom of the screw head 66 prior to the screw head 60 being tightened, and becomes equivalent to the cone angle at of the bottom of the screw head 66 when the screw 60 is tightened, because it is reduced accordingly when the screw 60 is tightened.

The invention claimed is:

1. A fastener combination comprising a screw, having a shaft and a head, and a separate circular conical gasket on the shaft that can rotate relative to the head and is or can be guided to a bottom of the screw head for fastening a component on a sub-structure under a tight compression of the conical gasket to the component, the gasket comprises a conical flat metal ring having a cone angle ($\alpha_2$) measured in reference to a line perpendicular to an axis of the gasket and a bottom facing the component to be fastened, the bottom conically expands and includes an elastomer seal connected thereto, the screw head (36, 66) is embodied at a bottom (34, 64) thereof around the shaft (32) as an upwardly directed cone-shaped recess having a cone angle ($\alpha$1) measured in reference to a line perpendicular (31) in reference to the screw axis (33) tapering in a direction of a top (38, 68) of the screw head (36, 66) and the cone angles ($\alpha_1$, $\alpha_2$) are equal such that the bottom (34, 64) of the screw head (36, 66) and the conical metal ring (41, 51) are mutually in planar contact.

2. A combination according to claim 1, wherein the cone angle ($\alpha_1$) of the bottom (34, 64) of the screw head (36, 66) has a value ranging from 5° to 15°.

3. A combination according to claim 1, wherein the elastomer seal (42, 52) comprises a terpolymer elastomer.

4. A combination according to claim 1, wherein the elastomer seal (42, 52) comprises an ethylene-propylene-diene rubber.

* * * * *